US009203830B2

(12) United States Patent
Gargaro et al.

(10) Patent No.: US 9,203,830 B2
(45) Date of Patent: *Dec. 1, 2015

(54) ESTABLISHING AND MAINTAINING AN IMPROVED SINGLE SIGN-ON (SSO) FACILITY

(71) Applicant: International Business Machines Corporation, Armonk, NY (US)

(72) Inventors: Gianluca Gargaro, Rome (IT); Gaetano Ruggiero, Rome (IT); Patrizio Trinchini, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,976

(22) Filed: Jun. 24, 2014

(65) Prior Publication Data

US 2014/0304794 A1  Oct. 9, 2014

Related U.S. Application Data

(63) Continuation of application No. 13/392,557, filed as application No. PCT/EP2010/060308 on Jul. 16, 2010, now Pat. No. 8,763,104.

(30) Foreign Application Priority Data

Aug. 27, 2009 (EP) .................................. 09168782

(51) Int. Cl.
*G06F 21/00* (2013.01)
*H04L 29/06* (2006.01)
*G06F 21/41* (2013.01)

(52) U.S. Cl.
CPC ............ *H04L 63/0815* (2013.01); *G06F 21/41* (2013.01); *H04L 63/0884* (2013.01)

(58) Field of Classification Search
USPC ........................................................ 726/1, 8
See application file for complete search history.

(56) References Cited

U.S. PATENT DOCUMENTS 5,944,824 A  8/1999  He
6,178,511 B1  1/2001  Cohen et al.
(Continued)

FOREIGN PATENT DOCUMENTS

EP  1705598 A2  9/2006
WO  2011023456 A2  3/2011

OTHER PUBLICATIONS

"Evaluation of Edge Caching/Offloading for Dynamic Content Delivery"; Yuan et al; IEEE Transactions on Knowledge and Data Engineering, vol. 16, No. 12, Dec. 2004; 13 pages.*

(Continued)

*Primary Examiner* — Jason Lee
(74) *Attorney, Agent, or Firm* — Cuenot, Forsythe & Kim, LLC

(57) ABSTRACT

A login page being sent to a browser executing on a client associated with a user from a back-end server is intercepted. A routine is added to the login page to generate a modified login page. The modified login page is forwarded to the browser. The browser, upon executing the routine, loads an asynchronous engine configured to execute a login process with an authentication profiling service to retrieve login information for the back-end server, and complete an authentication process with the back-end server.

10 Claims, 10 Drawing Sheets

(56) References Cited

U.S. PATENT DOCUMENTS

| | | | |
|---|---|---|---|
| 6,938,158 B2 | 8/2005 | Azuma | |
| 7,246,230 B2 | 7/2007 | Stanko | |
| 7,490,141 B1 | 2/2009 | Cammarata et al. | |
| 7,523,401 B1 | 4/2009 | Aldridge | |
| 7,634,803 B2 * | 12/2009 | Birk et al. | 726/8 |
| 7,958,232 B1 * | 6/2011 | Colton et al. | 709/224 |
| 8,763,104 B2 | 6/2014 | Gargaro et al. | |
| 8,769,650 B2 | 7/2014 | Gargaro et al. | |
| 2002/0007460 A1 | 1/2002 | Azuma | |
| 2004/0111491 A1 | 6/2004 | Raja et al. | |
| 2004/0123144 A1 * | 6/2004 | Chan et al. | 713/201 |
| 2009/0049183 A1 | 2/2009 | Thompson et al. | |
| 2009/0249440 A1 * | 10/2009 | Platt et al. | 726/1 |
| 2011/0055912 A1 | 3/2011 | Fusari et al. | |
| 2012/0167193 A1 | 6/2012 | Gargaro et al. | |
| 2013/0074172 A1 | 3/2013 | Gargaro et al. | |
| 2014/0304793 A1 | 10/2014 | Gargaro et al. | |

OTHER PUBLICATIONS

"OASIS: Security Assertion Markup Language (SAML) V2.0 Technical Overview", [online] OASIS Open 2006, Oct. 9, 2006 [retrieved Feb. 27, 2012] retrieved from the Internet: <http://www.oasis-open.org/committees/download.php/20645/sstc-saml-tech-overview-2%200-draft-10.pdf> 61 pgs.

International Search Report, WIPO Application No. PCT/EP2010/060308, Feb. 11, 2011, 3 pgs.

Yuan, et al., "Evaluation of Edge Caching/Offloading for Dynamic Content Delivery," IEEE Trans. on Knowledge and Data Engineering, vol. 16, No. 12, Dec. 2004, 13 pg.

U.S. Appl. No. 13/392,557, Non-Final Office Action, Apr. 22, 2013, 24 Pg.

U.S. Appl. No. 13/392,557, Final Office Action, Oct. 21, 2013, 23 Pg.

U.S. Appl. No. 13/392,557, Notice of Allowance, Feb. 7, 2014, 14 Pg.

U.S. Appl. No. 13/614,795, Non-Final Office Action, May 8, 2013, 33 Pg.

U.S. Appl. No. 13/614,795, Final Office Action, Oct. 18, 2013, 33 Pg.

U.S. Appl. No. 13/614,795, Notice of Allowance, Feb. 19, 2014, 15 Pg.

USPTO search result of "javascript" ownership, Dec. 1, 1995.

* cited by examiner

```
<html>
<head>
<script type="text/javascript">
function ajaxFunction()
{
var xmlHttp;
try
  {
  // Firefox, Opera 8.0+, Safari
  xmlHttp=new XMLHttpRequest();
  }
catch (e)
  {
  // Internet Explorer
  try
    {
    xmlHttp=new ActiveXObject("Msxml2.XMLHTTP");
    }
  catch (e)
    {
    try
      {
      xmlHttp=new ActiveXObject("Microsoft.XMLHTTP");
      }
    catch (e)
      {
      alert("Your browser does not support AJAX!");
      return false;
      }
    }
  }
  xmlHttp.onreadystatechange=function()
    {
    if(xmlHttp.readyState==4)
      {
      document.myForm.time.value=xmlHttp.responseText;
      }
    }
  xmlHttp.open("GET","http://myprofilingserver.com/Getaccount.jsp?username=xxx",true);
  xmlHttp.send(null);
  }
</script>
</head>
<body onload="ajaxFunction()">
<form name="LoginForm">
Name: <input type="text" name="username" />
Password: <input type="password" name="password" />
</form>
</body>
</html>
```

*Fig. 10*

ESTABLISHING AND MAINTAINING AN IMPROVED SINGLE SIGN-ON (SSO) FACILITY

CROSS-REFERENCE TO RELATED APPLICATIONS

This application is a continuation of U.S. application Ser. No. 13/392,557, filed 27 Feb. 2012, which is the national stage of PCT/EP2010/060308 filed 16 Jul. 2010, designating, inter alia, the United States and claiming priority to European Patent Application No. 09168782.1 filed 27 Aug. 2009, each of which is hereby incorporated by reference.

FIELD OF THE INVENTION

The present invention relates to a method and system for establishing and maintaining a Single Sign-on (SSO) facility, particularly but not exclusively in relation to a web based facility between a reverse proxy and a "back-end" server.

BACKGROUND OF THE INVENTION

In the environment of establishing a Single Sign-on facility between a reverse proxy and a back-end server, form-based SSO methods are generally inefficient. This is due to the need for both the reverse proxy and back-end server to authenticate every user.

In addition, most reverse proxies and back-end servers use different user registries, which leads to the requirement of having two sets of authentication information to maintain and synchronize. A back-end server is one which does not have direct connection to the outside world, external processes, users, etc.

The prior art related to SSO is identified below, although this prior art fails to solve many of the background problems.

U.S. Pat. No. 6,938,158 relates to a "Single sign-on system and Single Sign-on method for a web site and recording medium" and discloses an optimization of the authentication flows for requests over different back-end servers. The reverse-proxy is designed to provide storage of the previously provided authentication credentials for an already authenticated back-end server and to perform a Single Sign-on at the very next interaction over an http request. A reverse-proxy is a proxy server installed within the neighborhood of one or more servers, and is typically in front of the web server.

U.S. Pat. No. 7,246,230 relates to a "Single sign-on over the Internet using public-key cryptography". This patent discloses an Enterprise Application Server which may provide access to several applications, some of them residing on the same page context, but each one secured with a different account profile. This patent provides the generation of a security token at the very first authentication request and trusts the same token for any subsequent authentication requests.

U.S. Pat. No. 5,944,824 relates to a "System and method for Single Sign-on to a plurality of network elements" and describes a method for providing Single Sign-on (SSO) network integration across different system components. This includes password management and requires that the end user authenticates only once to a security service provider. The entire SSO logic is on the server side.

U.S. Pat. No. 6,178,511 relates to "Coordinating user target logons in a Single Sign-on (SSO) environment" and discloses a component named Logon Coordinator, which is in charge of administering the login access to a back-end application for a specified user. The entire SSO logic is still implemented on the server side. This has a number of disadvantages. In addition this patent offers no password management, which has obvious disadvantages. Users provisioning on the back-end must be implemented as there is no provision to reduce redundancy in storage of user profiles.

Object of the Invention

One object of the present invention is to provide a method and system to facilitate single sing-on, which overcomes at least some of the problems in the prior art and in current day systems.

SUMMARY OF THE INVENTION

The present invention is directed to a method for establishing and maintaining a Single Sign-on between a reverse proxy and a back-end server, comprising: instigating an authentication process through a browser in order for a user to obtain access to the back-end server; intercepting a login page from the back-end server at the reverse proxy and adding a routine thereto, thereby loading an asynchronous engine on the browser executing a login process with an authentication profiling service, in order to retrieve the login information for the back-end server; completing the authentication process with the back-end to allow the user access the back-end server through the asynchronous engine.

The present invention further discloses a system for establishing and maintaining a Single Sign-on between a reverse proxy and a back-end server, comprising: a browser for instigating an authentication process in order for a user to obtain access to the back-end server; an injection module for intercepting a login page from the back-end server at the reverse proxy and adding an JavaScript routine thereto, thereby loading an AJAX engine between the browser and the reverse proxy executing a login process with an authentication profiling service using the AJAX engine, in order to retrieve the login information for the back-end server; the AJAX engine further completing the authentication process to allow the user access to the back-end server.

Note that the routine and the injection modules are written in a language understandable by the browser. The language may be a scripting language such as Javascript.

Other aspects of the invention can be seen in the appended dependant claims.

BRIEF DESCRIPTION OF THE DRAWINGS

Reference will now be made by way of example to the accompanying drawings, in which:

FIG. 10 is an example of JavaScript to trigger the AJAX engine in accordance with an embodiment of the invention, by way of example.

DETAILED DESCRIPTION OF THE PREFERRED EMBODIMENT

The present invention relates to a method and system for establishing a connection over a network using a technique of Web Single Sign-on.

The present invention makes use of an asynchronous engine application that works on the client side (e.g. an AJAX application) and it is thus possible to eliminate the need for interaction between the reverse-proxy and the back-end application when performing the FSSO (federated Single Sign-on) operation. By introducing an intermediary asynchronous engine, e.g. an AJAX engine, between the user and the reverse-proxy it is possible that the browser itself can perform the login to the back-end application, thereby offloading this task from the reverse-proxy. With this solution it is even possible to handle initial provisioning and any password-care operations so that the synchronization of registries by external provisioning software is no more needed. A federated Single Sign-on operation is one under which standardization is used to enable cross domain authentication with a Single Sign-on name and password.

Figure 1:
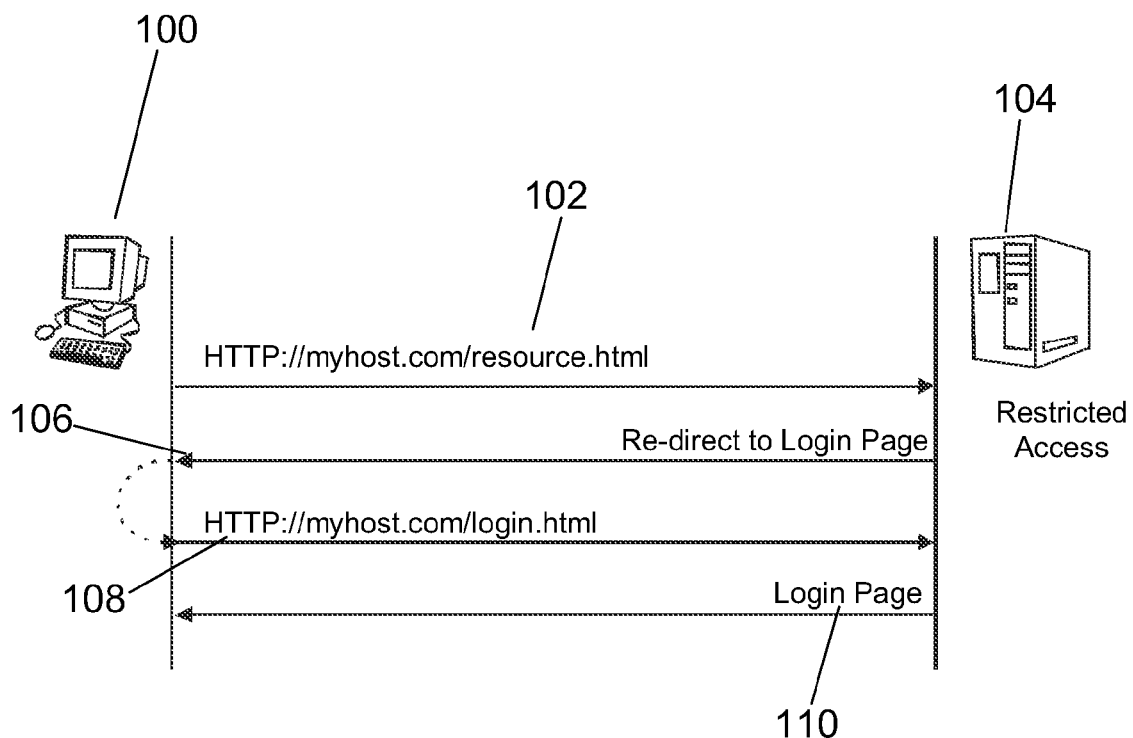
FIG. 1 is a diagram of a typical form based login scenario in accordance with an embodiment of the invention, by way of example.

FIG. 1 shows a form based login scenario where a user 100 requests a protected page 102 and the Web Server 104 redirects the user to a login page (106). The user is then required to fill in a username and a password 108 and submit the form login to the server. The login page is released if the username and password is authenticated 110.

Figure 2:
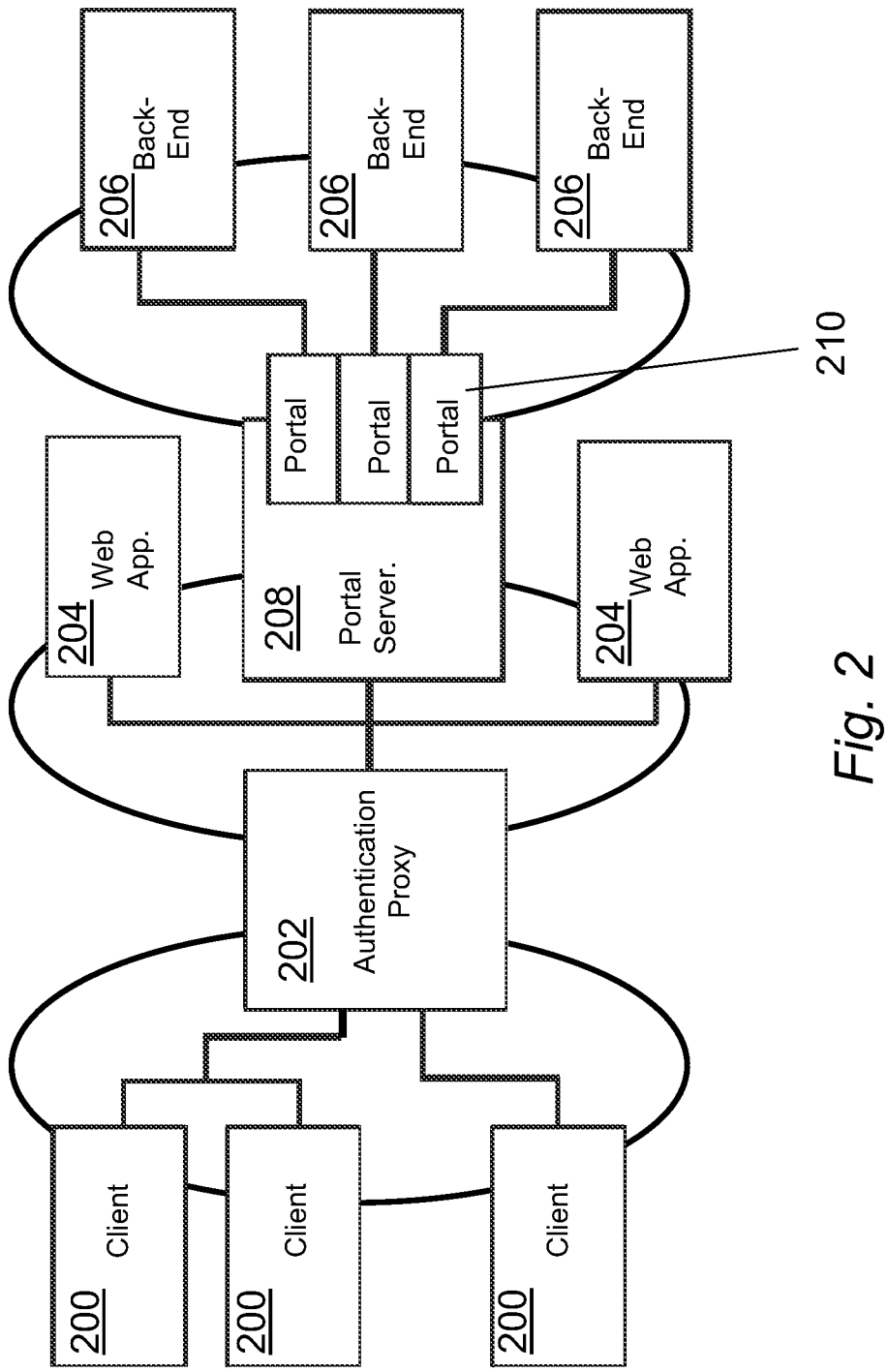
FIG. 2 is a diagram of a typical scenario with an integrated Single Sign-on solution in accordance with an embodiment of the invention, by way of example.

A reverse proxy may be included and is required to provide an integrated Single Sign-on solution. The user only logs in to the reverse proxy at the beginning of a session and then is afforded access to multiple Web applications without the need for re-authentication. This is shown in FIG. 2.

One or more clients 200 are connected by means of a reverse proxy 202 to one or more web application 204. In addition, the reverse proxy 202 connects to one or more back-end servers 206, via a portal server 208 having ports 210.

In this example it is the responsibility of the proxy to automatically perform a login on behalf of the user for each protected application.

Figure 3:
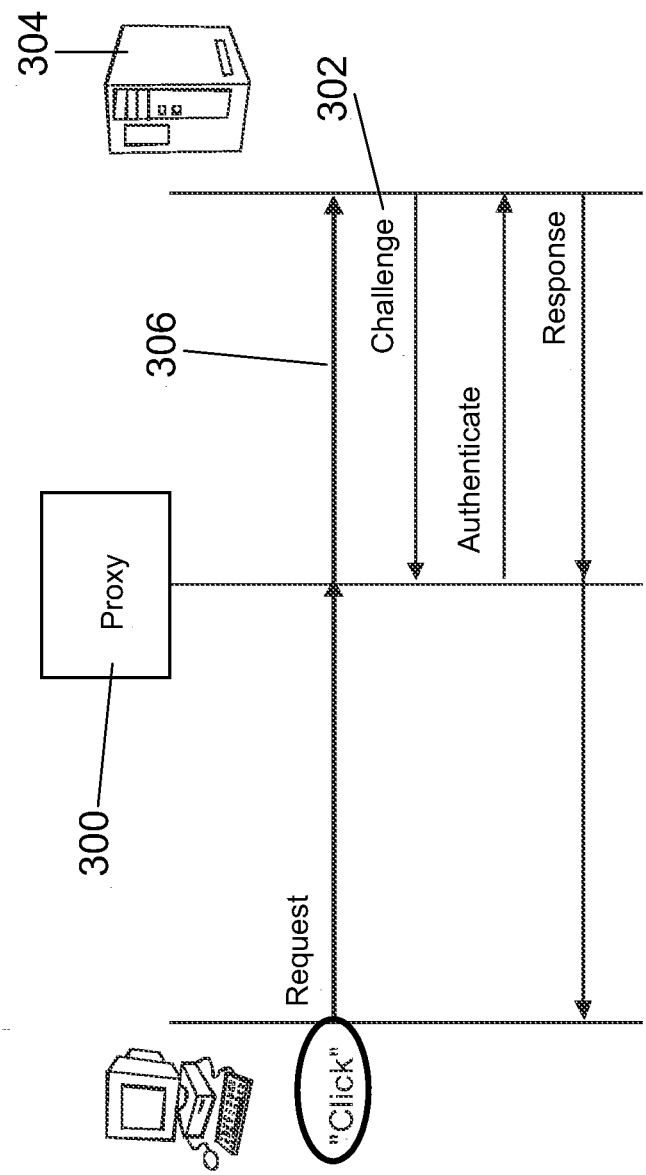
FIG. 3 is a diagram showing a technique for proxy interception and authentication in accordance with an embodiment of the invention, by way of example.

FIG. 3 shows a technique where a proxy 300 intercepts and processes the authentication challenge 302 from the back-end server 304, in response to a user request 306.

In this example the Proxy server completes the form with the correct account information (username/password) to authenticate 310 the user for the relevant back-end application.

A user may have different accounts, for example one for each application. If the reverse proxy integrates three back-end applications and there are 100 users identified in the proxy, the proxy should be able to handle authentication for about 400 (100+300) different accounts.

Typically account information is stored in a user registry such as a database or a light-weight directory access protocol (LDAP) server.

Figure 4:
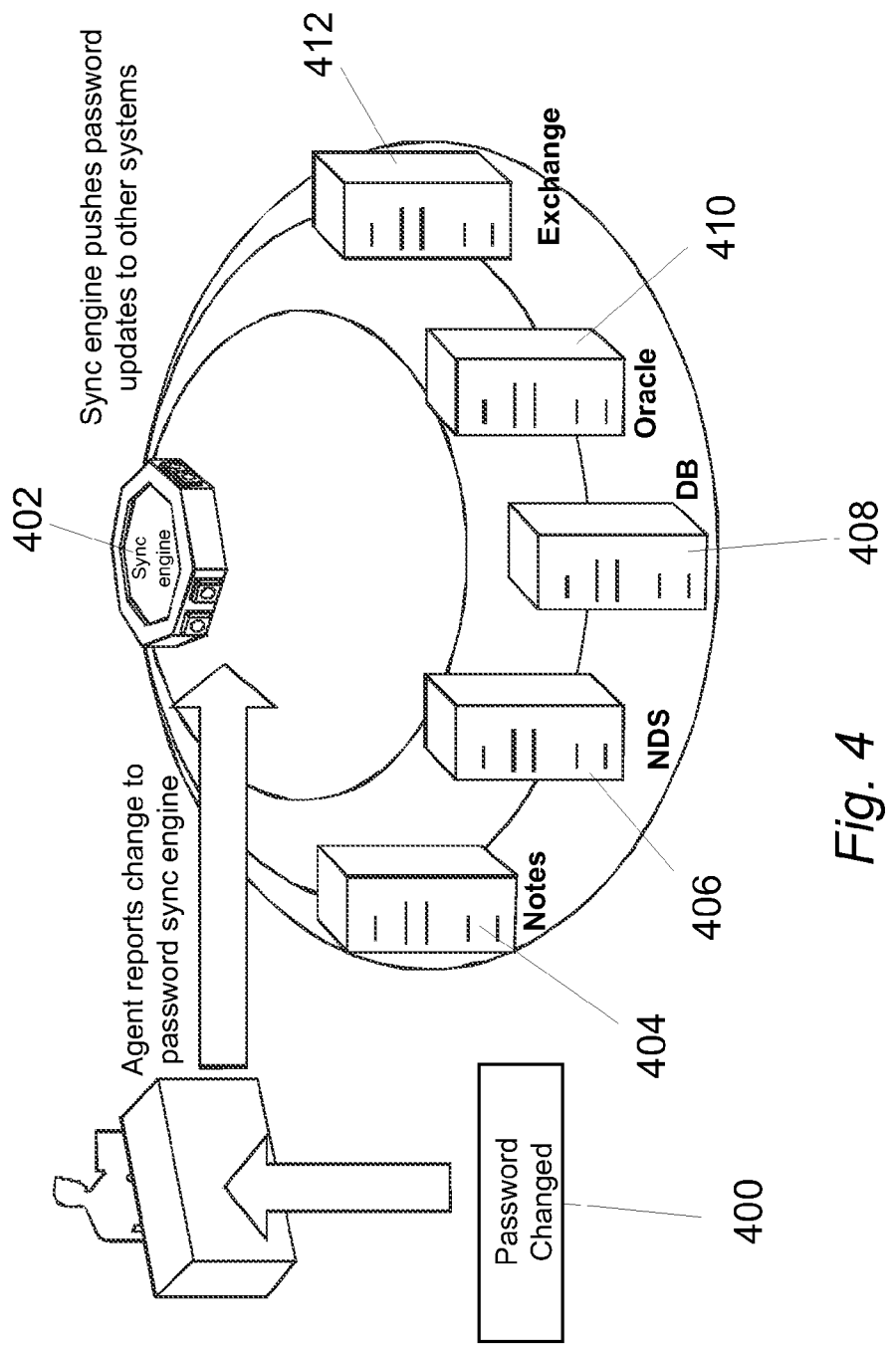
FIG. 4 is a diagram showing a synchronization procedure in accordance with an embodiment of the invention, by way of example.

Generally the user registry used by the proxy cannot be the same as that used by the back-end application. Accordingly, if a Single Sign-on process is to be successful each time a user wishes it is necessary to implement a synchronization procedure using an external provisioning or metadirectory application as shown in FIG. 4. In FIG. 4 a password is changed 400 and reported to the synchronization engine 402. The synchronization engine pushes the password update to the other systems, for example: Notes 404, NDS 406, Databases 408, Oracle 410, Exchange 412 etc.

Figure 5:
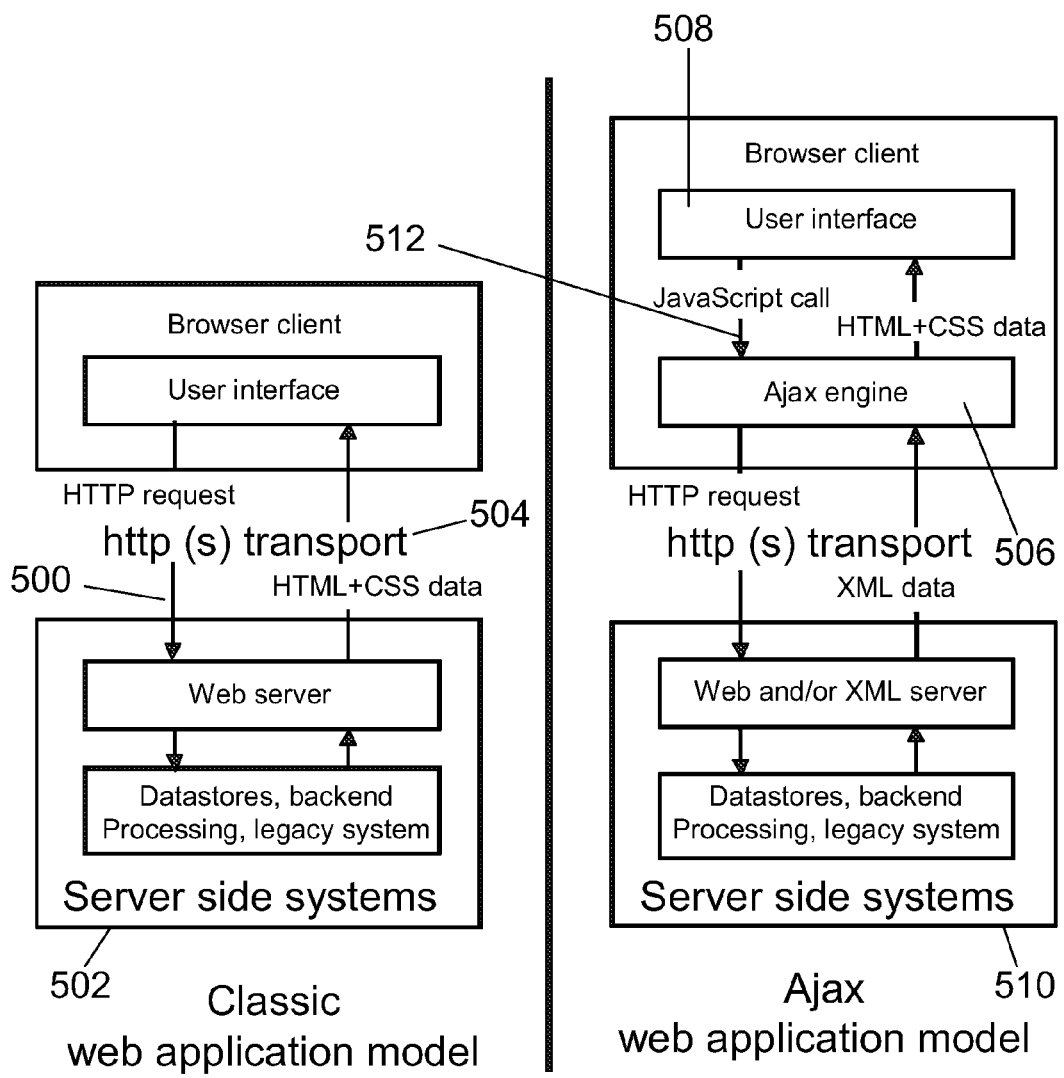
FIGS. 5 and 6 are diagrams showing a comparison of a classic web model and an AJAX web application model for SSO in accordance with an embodiment of the invention, by way of example.
Figure 6:
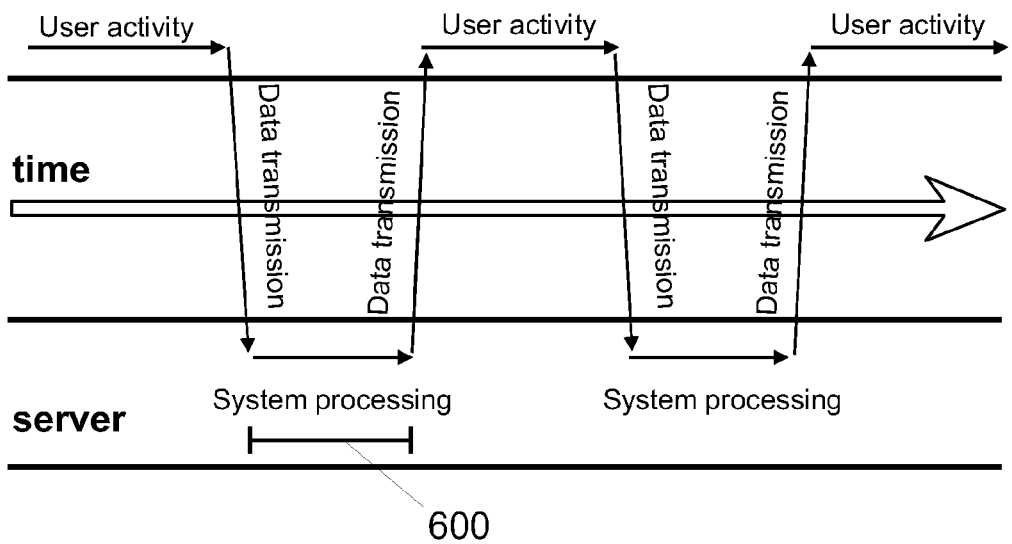
Figure 6:
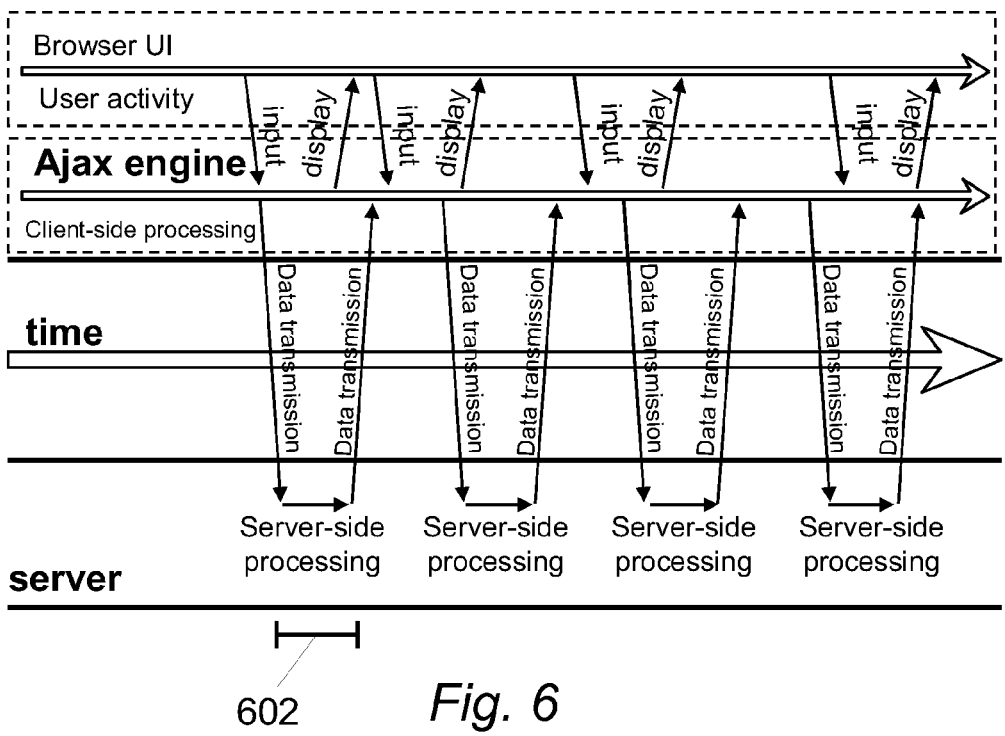

FIGS. 5 and 6 show comparisons between a classic web application model and an AJAX web application model in order to explain the present invention. In the classic web application model most user actions at the interface trigger an HTTP request 500 from a web server 502. The server caries out certain processing steps, for example retrieving data, calculations, communications, and then passes an HTML page 504 to the user.

An AJAX application eliminates the start-stop nature of interactions on the network by introducing an intermediary device such as an AJAX engine 506 between the user 508 and the server 510. By adding this layer to the application it would seem likely that the process becomes less responsive, however the opposite is actually true.

Instead of loading a webpage at the start of the session the browser loads an AJAX engine. This is written in JavaScript and is usually in a hidden frame. The AJAX engine is responsible for producing the interface presented to the user and communicating with the server on behalf of the user. The AJAX engine allows the interaction of the user with the application to happen in an asynchronous manner, which is independent of any communication with the server. As a result, the user is not now presented with a blank browser window or an hourglass icon whilst waiting for the server to do something.

Each user action that would normally generate an HTTP request takes the form of a JavaScript call 512 to the AJAX engine. Any response to a user action that does not require a response from the server is handled directly by the engine. For example, simple data validation, data editing, and even simple navigation may be carried out by the engine. If the engine requires input from the server in order to respond, the engine makes these requests in an asynchronous manner, usually using XML. For example, submitting data for processing, loading additional interface code, or retrieving new data may require server input.

Referring to FIG. 6, it can be seen that the overall processing time for specific cycles or actions can be very much reduced by using the AJAX engine. This is due to the fact that user requests are handled in an asynchronous manner with the AJAX engine. For a classic web application the processing time 600 is much more than that using the AJAX engine 602.

Figure 7:
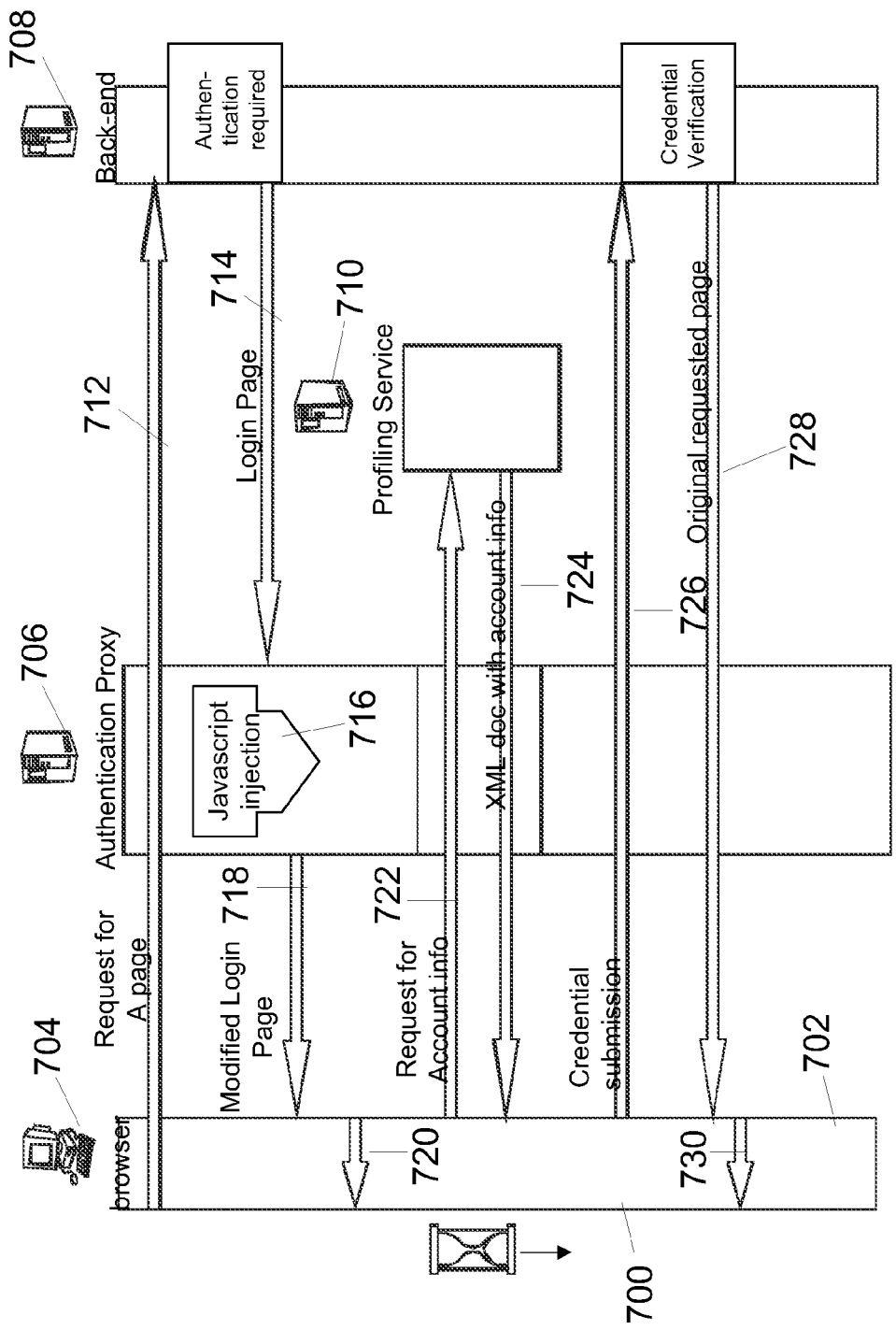
FIG. 7 is a diagram showing the system and method requirements for a login process in accordance with an embodiment of the invention, by way of example.

The login process in accordance with the present invention is shown in FIG. 7. FIG. 7 figuratively shows a user screen 700 and an AJAX engine 702 forming part of a browser 704. The browser is in communication with an authentication or reverse-proxy 706 which communicates with a back-end server 708. At a certain point in time a profiling service 710 may be accessed. In the diagram time increases in the downward direction. The method steps taken will now be described with reference to various actions indicated in FIG. 7.

Assuming a user is already authenticated at the proxy, the user may ask for a resource hosted on a back-end server that requires authentication from the back-end, as shown by request 712. The back-end server requires verification if the request comes from a user which is not authenticated for the back-end server. An authentication challenge is sent back to the user in the form of a login page 714. The proxy intercepts the login page from the back-end by following a mapping rule and adds a JavaScript routine 716 in order to load the code for the AJAX engine (not shown). The browser loads the modified login page 718 and the AJAX engine starts to execute the login process in an asynchronous manner with the back-end server as follows. The browser AJAX engine displays one or more message 720 to the user, such as "connecting to protected application". In the meantime, the AJAX engine contacts the Authentication Profiling Services and requests the user account for the requested back-end application 722. The Authentication Profiling Services then sends authentication data 724 to the browser in the form of an XML document. The browser AJAX engine then augments the authentication XML data and submits a set of credentials via a login form 726. The login form is received at the back-end server and the credentials are verified in order to finalize the authentication procedure. The back-end server sends the original requested data to the user 728 and the browser AJAX engine stop switches off the message "connecting to protected application" and displays the requested data 730.

Figure 8:
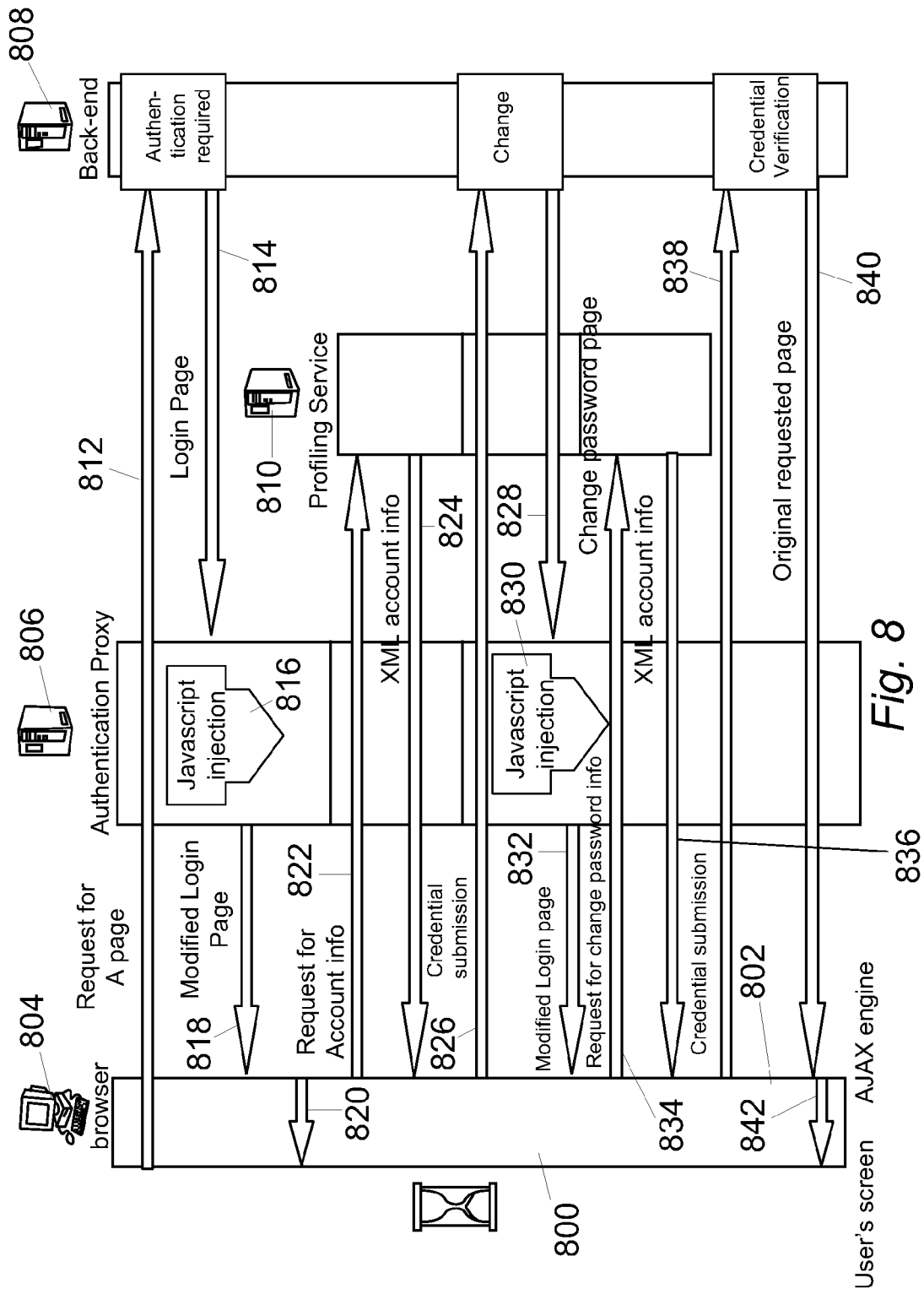
FIG. 8 is a diagram for the system and method requirements associated with a change of password in accordance with an embodiment of the invention, by way of example.

The system can be also be used to automatically maintain the account information of a user and autosynchronize all user registries without needing an external provisioning system and without any user input. A typical situation that can arise is changing a password in the back-end application as a result of expiry of the password. The user does not need to retain the account information for the back-end application since the Single Sign-on procedure described above can handle this. The password changing process can occur automatically using the AJAX engine and without any user interaction. FIG. 8 shows the change of password process which figuratively shows a user screen 800 and an AJAX engine 802 forming part of a browser 804. The browser is in communication with an authentication proxy 806 which communicates with a back-end server 808. At a certain point in time a profiling service 810 may be accessed. In the diagram time increases in the downward direction. The method steps taken will now be described with reference to various actions indicated in FIG. 8.

Assuming a user is already authenticated at the proxy, the user may ask for a resource hosted on a back-end server that requires authentication from the back-end, as shown by request 812. The back-end server requires verification if the request comes from a user which is not unauthenticated for the back-end server. An authentication challenge is sent back to the user in the form of a login page 814. The proxy intercepts the login page from the back-end by following a mapping rule and adds a JavaScript routine 816 in order to load the code for the AJAX engine (not shown). The browser loads the modified login page 818 and the AJAX engine starts to execute the login process in an asynchronous manner with the back-end server as follows. The browser AJAX engine displays one or more message 820 to the user, such as "connecting to protected application". In the meantime, the AJAX engine contacts the Authentication Profiling Services and requests the user account for the requested back-end application 822. The Authentication Profiling Services then sends authentication data 824, to the browser in form of an XML document. The browser AJAX engine then augments the authentication XML data and submits a set of credentials via a login form 826. The login form is received at the back-end server and the credentials are verified in order to finalize the authentication procedure. The proxy intercepts the change password page 828 from the back-end by following a mapping rule and adds the JavaScript routine 830 for the AJAX engine. A modified login page 832 is presented to the user so that new password information 834 can be passed to the profiling server. The browser AJAX engine then contacts the Authentication Profiling Services to start a change-password procedure in respect of the user account for the back-end application. The Authentication Profiling Services then generates a new password and stores it in the appropriate use registry. The authentication data with new and old password in the form of an XML document is returned to the browser. The browser AJAX engine augments the authentication XML data and submits the change password form to the back-end application 838. The back-end server processes the data and finalizes the change password/authentication procedure. The back-end server then sends the original requested data 840 to the user whilst the browser AJAX engine stops displaying the message "connecting to protected application" and instead displays the original requested page to the user 842.

The system can be also used to automatically start a self provisioning operation for those users that have an account on the authentication proxy but do not yet have an account on the back-end server. In general this task can be time and resource consuming, especially where strict account generation policies are implemented using provisioning tools. For example, in situations where management approval of workflow is required. However, there are other situations where such a strict account generation policy is not needed and the application can simply provide a link option to create an account where the user is not yet registered.

In this case it is possible to use the present system and method to automatically generate an account without the intervention of the user and without any external provisioning tool.

A user does not need to retain account information for the back-end application since the Single Sign-on procedure described above handle this the initial account process can automatically be carried out using an AJAX engine and without any user interaction.

Figure 9:
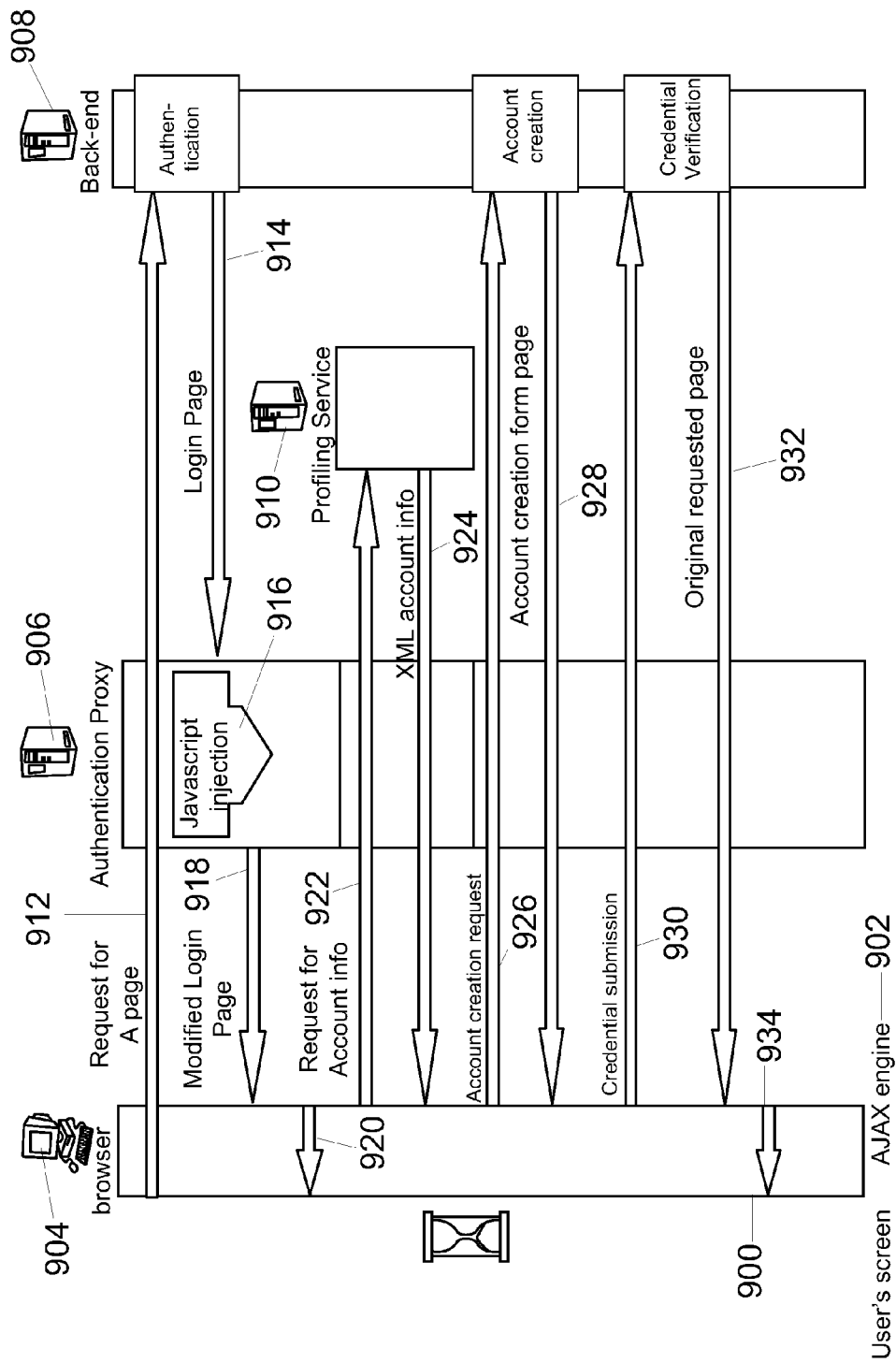
FIG. 9 is a diagram for the system and method requirements associated with a self provisioning operation in accordance with an embodiment of the invention, by way of example.

FIG. 9 shows the change of password process which figuratively shows a user screen 900 and an AJAX engine 902 forming part of a browser 904. The browser is in communication with an authentication proxy 906 which communicates with a back-end server 908. At a certain point in time a profiling service 910 may be accessed. In the diagram time increases in the downward direction. The method steps taken will now be described with reference to various actions indicated in FIG. 9.

Assuming a user is already authenticated at the proxy, the user may ask for a resource hosted on a back-end server that requires authentication from the back-end, as shown by request 912. The back-end server requires verification if the request comes from a user which is not unauthenticated for the back-end server. An authentication challenge is sent back to the user in the form of a login page 914. The proxy intercepts the login page from the back-end by following a mapping rule and adds a JavaScript routine 916 in order to load the code for the AJAX engine (not shown). The browser loads the modified login page 918 and the AJAX engine starts to execute the login process in an asynchronous manner with the back-end server as follows. The browser AJAX engine displays one or more message 920 to the user, such as "connecting to protected application". In the meantime, the AJAX engine contacts the Authentication Profiling Services and requests the user account for the requested back-end application 922. The Authentication Profiling Services then sends authentication data 924, to the browser in form of an XML document. The browser AJAX engine then augments the authentication XML data and submits a set of credentials via a login form 926. The login form is received at the back-end server and the credentials are verified in order to finalize the authentication procedure and provide the create account page to the client. The browser receives this form and the AJAX engine fills in the account creation form fields using the XML data received. The back-end server receives and processes the data 930 and finalizes the account creation procedure and the original data is sent 932 and displayed 934. From now on the user has an account at the back-end server and the initial password is synchronized in both registries.

The AJAX engine can be simply be triggered by a JavaScript function to be included in the page, an example can be as shown in FIG. 10.

The present invention is adaptable to carry out different services. The following is a non-exhaustive list of possible services:

Avoiding a Single Sign-on procedure remote from proxy;
Auto provisioning;
User registry auto-synchronization with no need for external synchronization tools;
User enhanced browsing experiences; and
Increased security due to a simplified account management technique.

The invention claimed is:

1. A computer-implemented method performed by a proxy hardware system, comprising:
    intercepting, from a back-end server, a login page being sent to a browser executing on a client associated with a user;
    adding a routine to the login page to generate a modified login page; and
    forwarding the modified login page to the browser, and
    the browser, upon executing the routine, loads an asynchronous engine configured to
    execute a login process with an authentication profiling service to retrieve login information for the back-end server, and
    complete an authentication process with the back-end server.

2. The computer-implemented method of claim 1, wherein the asynchronous engine is an AJAX engine.

3. The computer-implemented method of claim 1, wherein the authentication profile service is configured to store, for the user, a user ID and password for the back-end server.

4. The computer-implemented method of claim 1, wherein the authentication profile service is configured to store, for the user, a plurality of user IDs and passwords, respectively, for a plurality of back-end servers.

5. The computer-implemented method of claim 1, wherein the asynchronous engine is further configured to update a password of the user on the back-end server responsive to a request by the user.

6. The computer-implemented method of claim 1, wherein the authentication process is completed without the proxy hardware system after the routine is added to the login page.

7. The computer-implemented method of claim 1, wherein the authentication process is a federated single sign-on process.

8. The computer-implemented method of claim 1, further comprising
    intercepting, from the back-end server, a change password page being sent to the browser;
    adding a routine to the change password page to generate a modified change password page; and
    forwarding the modified change password page to the browser.

9. The computer-implemented method of claim 8, wherein the modified change password page, upon being executed by the browser, causes new password information to be forwarded to the authentication profiling service.

10. The computer-implemented method of claim 8, wherein
    a password change is synchronized for each back-end server in which an original password is in common.

* * * * *